US012699306B2

(12) United States Patent
Park et al.

(10) Patent No.: US 12,699,306 B2
(45) Date of Patent: Aug. 4, 2026

(54) CAMERA MODULE

(71) Applicant: LG INNOTEK CO., LTD., Seoul (KR)

(72) Inventors: Jong Hyun Park, Seoul (KR); Cheol Ho Kim, Seoul (KR); Gyung Mok Woo, Seoul (KR)

(73) Assignee: LG INNOTEK CO., LTD, Seoul (KR)

( * ) Notice: Subject to any disclaimer, the term of this patent is extended or adjusted under 35 U.S.C. 154(b) by 165 days.

(21) Appl. No.: 18/705,103

(22) PCT Filed: Nov. 16, 2022

(86) PCT No.: PCT/KR2022/018143
§ 371 (c)(1),
(2) Date: Apr. 26, 2024

(87) PCT Pub. No.: WO2023/090872
PCT Pub. Date: May 25, 2023

(65) Prior Publication Data
US 2024/0427219 A1 Dec. 26, 2024

(30) Foreign Application Priority Data
Nov. 18, 2021 (KR) ........................ 10-2021-0159091

(51) Int. Cl.
*G03B 17/08* (2021.01)
*G03B 17/55* (2021.01)
*G03B 30/00* (2021.01)
(52) U.S. Cl.
CPC ............. *G03B 17/08* (2013.01); *G03B 17/55* (2013.01); *G03B 30/00* (2021.01)

(58) Field of Classification Search
None
See application file for complete search history.

(56) References Cited

U.S. PATENT DOCUMENTS

| | | | | |
|---|---|---|---|---|
| 2016/0205294 A1* | 7/2016 | Ahn | ........................ | H04N 23/55 |
| | | | | 348/373 |
| 2019/0208626 A1 | 7/2019 | Han et al. | | |
| 2019/0222726 A1 | 7/2019 | Pan et al. | | |

(Continued)

FOREIGN PATENT DOCUMENTS

| | | | |
|---|---|---|---|
| CN | 207732848 U | * | 8/2018 |
| CN | 210201936 U | * | 3/2020 |

(Continued)

OTHER PUBLICATIONS

International Search Report dated Feb. 20, 2023 issued in Application No. PCT/KR2022/018143.

(Continued)

*Primary Examiner* — Rodney E Fuller
(74) *Attorney, Agent, or Firm* — KED & Associates, LLP

(57) ABSTRACT

A camera module comprises: a first body; a second body coupled to a rear surface of the first body; a substrate disposed between the first body and the second body; and a lens module coupled to a front surface of the first body; wherein the first body includes a front plate and a first side plate extending rearward from the first plate, the second body includes a rear plate and a second side plate extending forward from the rear plate, and the first side plate and the second side plate are hook-coupled.

20 Claims, 8 Drawing Sheets

(56) References Cited

U.S. PATENT DOCUMENTS

| | | | | |
|---|---|---|---|---|
| 2020/0145560 A1 | 5/2020 | Han | | |
| 2020/0269771 A1 | 8/2020 | Sim et al. | | |
| 2020/0404133 A1* | 12/2020 | Yang | ..................... | H04N 23/57 |
| 2021/0084766 A1* | 3/2021 | Govrin | .............. | G02B 23/2469 |
| 2021/0318507 A1* | 10/2021 | Oh | ......................... | H04N 23/54 |

FOREIGN PATENT DOCUMENTS

| | | | | | | |
|---|---|---|---|---|---|---|
| CN | 210274240 U | * | 4/2020 | | | |
| DE | 112010005629 B4 | * | 9/2019 | ............ | G03B 17/12 | |
| JP | 2010081136 A | * | 4/2010 | | | |
| JP | 2019-530898 | | 10/2019 | | | |
| KR | 101472675 B1 | * | 12/2014 | ............ | G03B 15/05 | |
| KR | 10-2018-0137139 | | 12/2018 | | | |
| KR | 20180137139 A | * | 12/2018 | .......... | H04N 5/2254 | |
| KR | 10-2019-0014868 | | 2/2019 | | | |
| KR | 10-2019-0027078 | | 3/2019 | | | |
| KR | 20190027078 A | * | 3/2019 | ......... | B60R 11/0229 | |
| KR | 10-2019-0099854 | | 8/2019 | | | |

OTHER PUBLICATIONS

European Search Report dated Oct. 16, 2025 issued in Application No. 22896077.9.

\* cited by examiner

【FIG. 1】
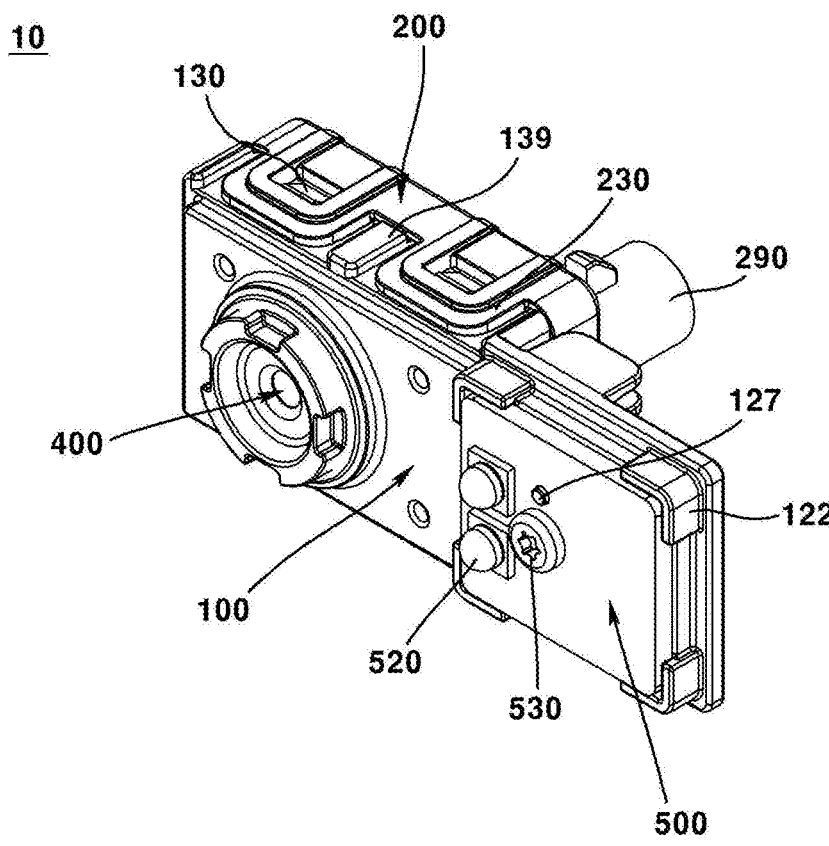

【FIG. 2】
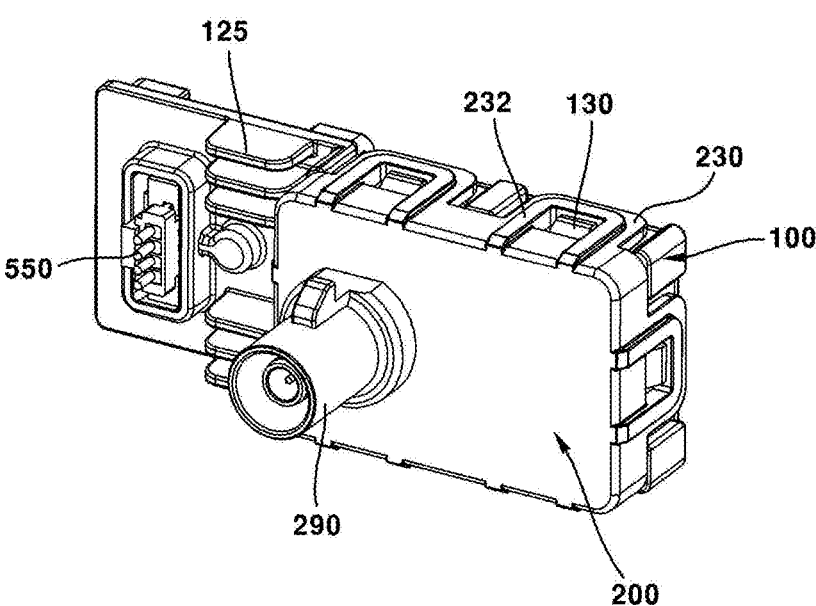

【FIG. 3】
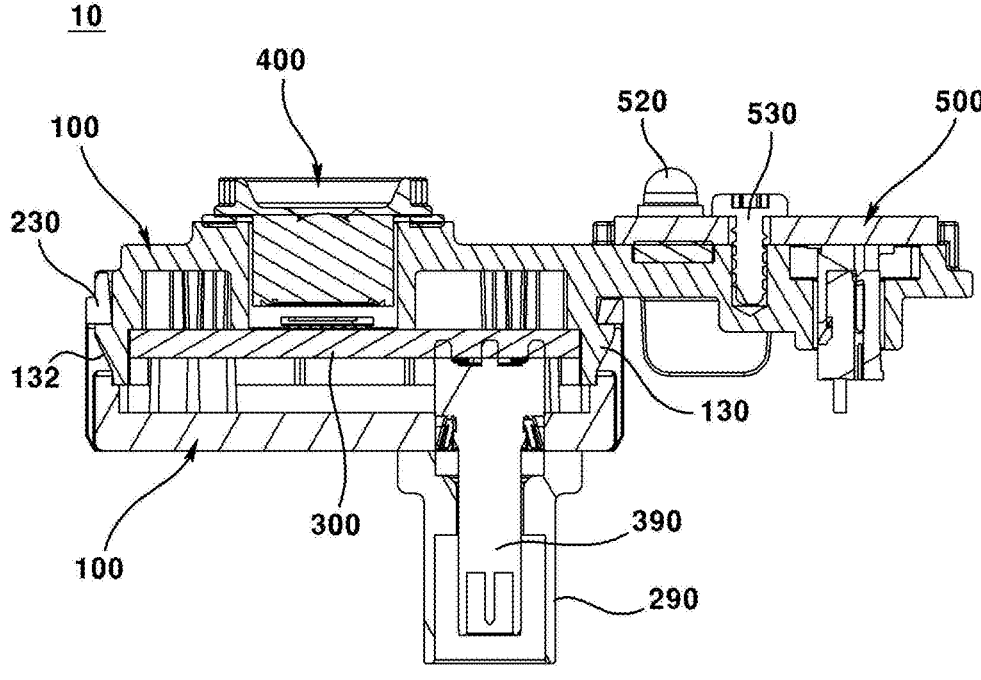
【FIG. 4】
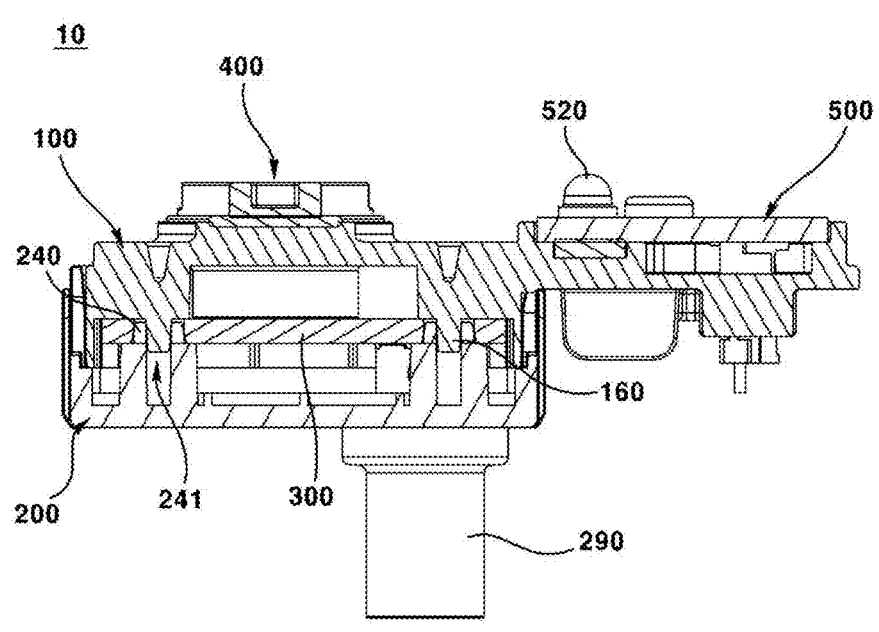

【FIG. 5】
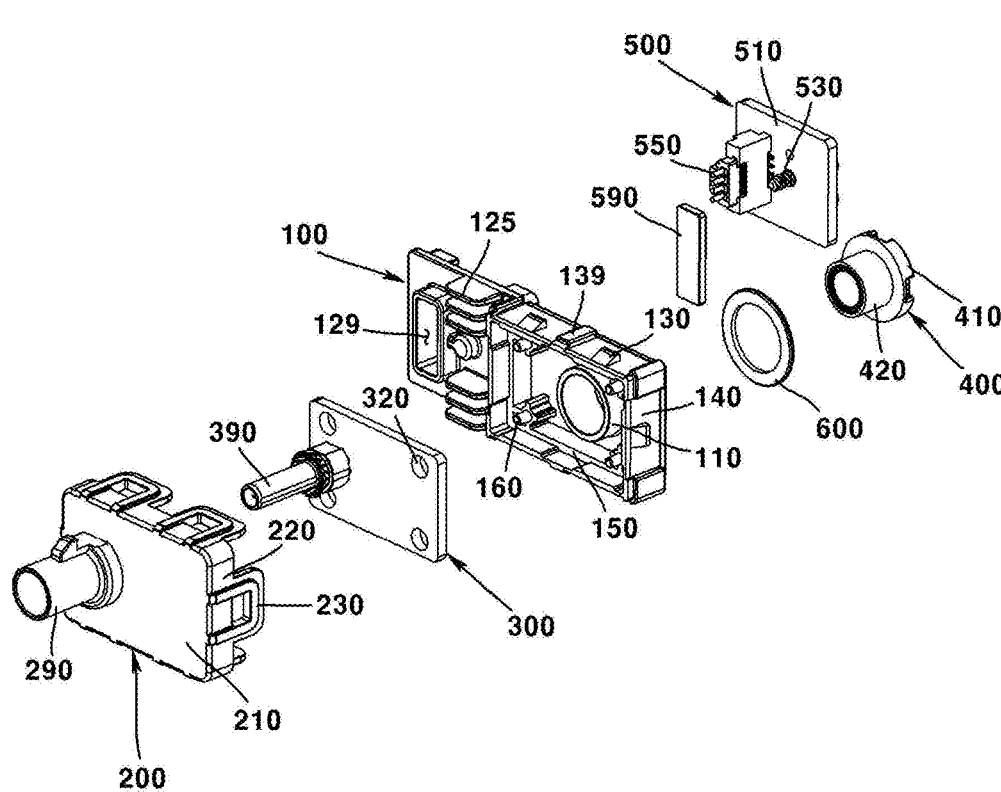

【FIG. 6】
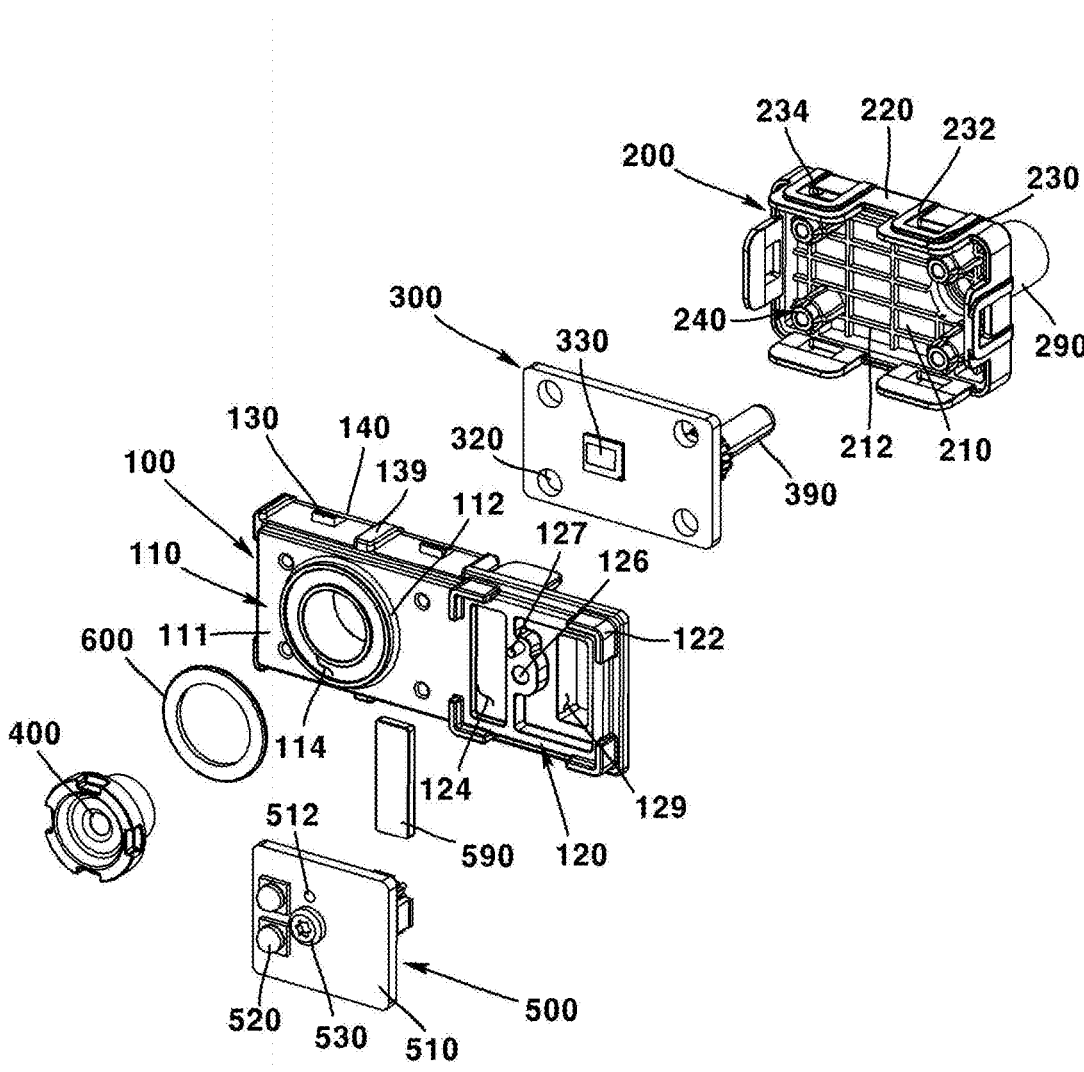

【FIG. 7】
<u>100</u>
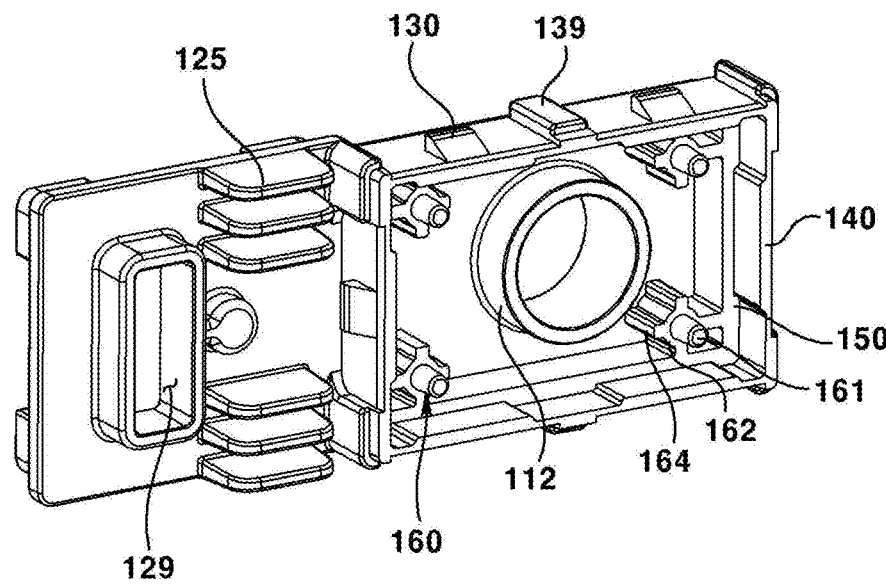

【FIG. 8】
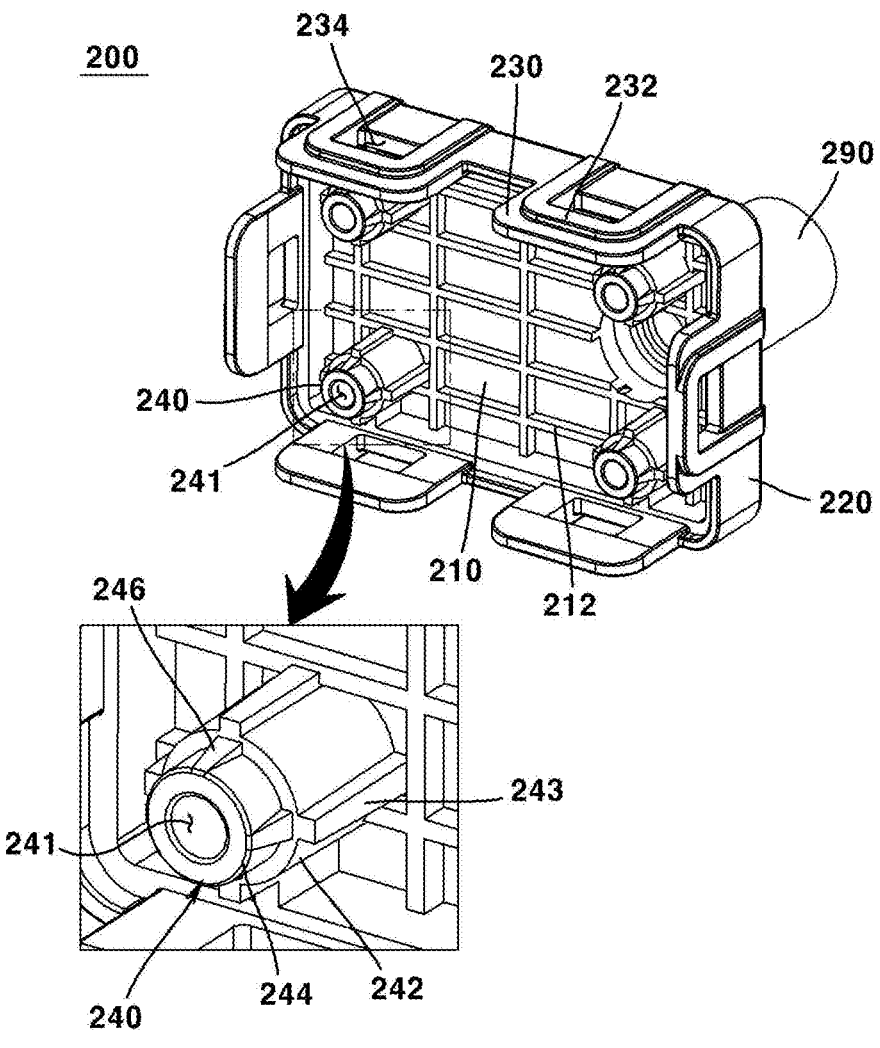

【FIG. 9】
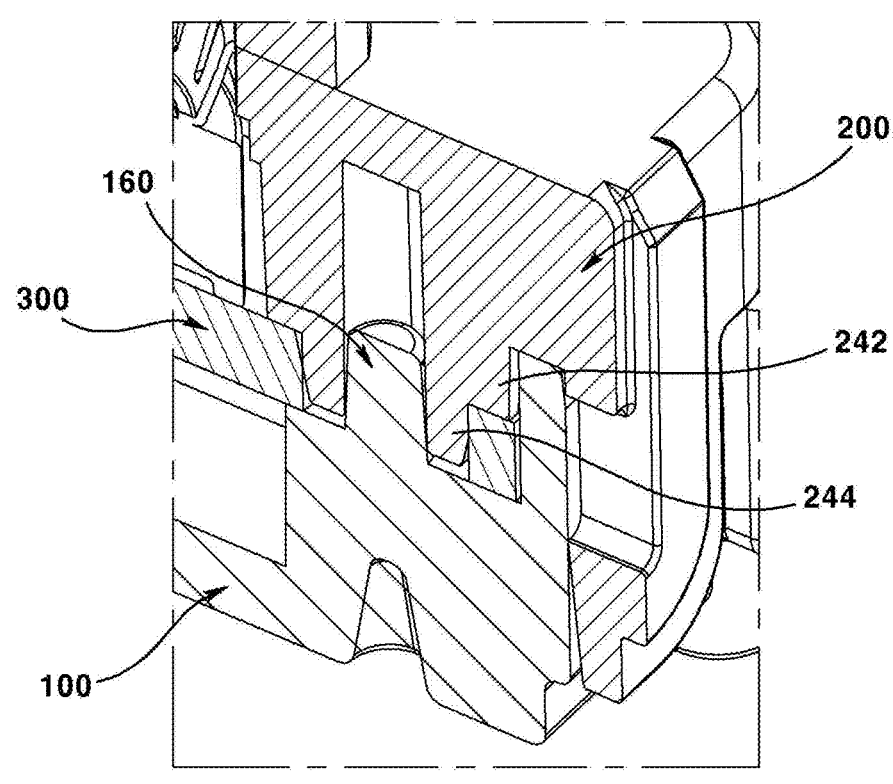

CAMERA MODULE

CROSS-REFERENCE TO RELATED PATENT APPLICATIONS

This application is a U.S. National Stage Application under 35 U.S.C. § 371 of PCT Application No. PCT/KR2022/018143, filed Nov. 16, 2022, which claims priority to Korean Patent Application No. 10-2021-0159091, filed Nov. 18, 2021, whose entire disclosures are hereby incorporated by reference.

TECHNICAL FIELD

The teachings in accordance with exemplary and non-limiting embodiments of the present invention relate generally to a camera module.

BACKGROUND ARTS

In recent years, subminiature camera modules have been developed, and subminiature camera modules are widely used in small electronic products such as smartphones, laptops, game consoles, etc.

With the popularity of automobiles, subminiature cameras are not only used in small electronic products, but also in vehicles. For example, there are dash cameras for vehicle protection or objective data of traffic accidents, rear view cameras that allow the driver to monitor the blind spot at the rear of the vehicle through a screen to ensure safety when reversing the vehicle, and peripheral detection cameras that can monitor the surroundings of the vehicle.

The camera may comprise a lens module, a lens holder for receiving the lens module, an image sensor for converting an image of a subject gathered in the lens of the lens into an electrical signal, and a printed circuit board on which the image sensor is mounted. The housing forming the exterior of the camera may comprise an all-enclosed structure to prevent the internal components from being contaminated by foreign matter, including moisture.

The appearance of the camera module is generally composed of a plurality of bodies joined together, but a fastening means such as a screw is required to join the plurality of bodies together, which increases the manufacturing unit cost. In addition, since the screw and the body are made of different materials, there is a problem that foreign matter generated during the process of joining the screw to the body is introduced into the housing.

DETAILED DESCRIPTION OF INVENTION

Technical Subject

It is an object of the present exemplary embodiment to provide a camera module that can lower manufacturing unit costs by reducing the number of components, improve production efficiency by reducing assembly labor, and provide a camera module that can robustly join a plurality of bodies to each other.

Technical Solution

In one general aspect of the present invention, there may be provided a camera module comprising: a first body; a second body coupled to a rear surface of the first body; a substrate disposed between the first body and the second body; and a lens module coupled to a front surface of the first body; wherein the first body includes a front plate and a first side plate extending rearward from the first plate, the second body includes a rear plate and a second side plate extending forward from the rear plate, and the first side plate and the second side plate are hook-coupled.

Preferably, but not necessarily, an outer surface of the first side plate may be provided with a first projection projecting outwardly, and a front surface of the second side plate may be provided with a first coupling portion including a first coupling hole projecting forwardly to join the first projection.

Preferably, but not necessarily, on the upper surface of the first projection, a slope may be disposed in a shape wherein the projection height from the first side plate decreases towards the rear.

Preferably, but not necessarily, the outer surface of the first coupling portion may be provided with a protrusion that protrudes outwardly from the other areas.

Preferably, but not necessarily, each of the first protrusion and the first coupling portion may be provided in a plurality, and the region between adjacent first coupling portions may have a groove shape, and between adjacent first protrusions may be disposed a guide protruding outwardly from the outer surface of the first side plate and coupled to a region between adjacent first coupling portions.

Preferably, but not necessarily, the substrate may include a first hole passing from front to rear, the first body may include a second coupling portion projecting rearwardly from a rear surface of the front plate and disposed at least partially within the first hole, the second body projecting forwardly from a front surface of the rear plate and disposed at least partially within the first hole, and the second body may include a third coupling portion projecting forwardly from a front surface of the rear plate and disposed at least partially within the first hole.

Preferably, but not necessarily, a front of the third coupling portion may include a second hole in which at least a portion of the second coupling portion is coupled.

Preferably, but not necessarily, the second coupling portion may include a first protruding region projecting rearwardly from a rear surface of the front plate, and a second protruding region projecting rearwardly from a rear surface of the first protruding region, wherein a cross-sectional area of the first protruding region may be formed larger than a cross-sectional area of the second protruding region, wherein a rear surface of the first protruding region may support a front surface of the substrate, and wherein the second protruding region may be coupled to the second hole.

Preferably, but not necessarily, the third coupling portion may include a third protruding region projecting forward from a front side of the rear plate, and a fourth protruding region projecting forward from a front side of the third protruding region, wherein a cross-sectional area of the third protruding region may be formed larger than a cross-sectional area of the fourth protruding region, wherein a front side of the third protruding region may support a rear side of the substrate, and wherein the fourth protruding region may be coupled to the first hole.

Preferably, but not necessarily, the first body may include a first region in which the second body, the substrate and the lens module may be coupled, and a second region adjacent to the first region, and a light source module including a light source may be coupled on a front side of the second region.

Advantageous Effects

Since the present exemplary embodiment eliminates the need for separate parts such as screws for joining the plurality of bodies, it has the advantage of lowering the manufacturing unit cost and improving production efficiency by reducing the number of parts and assembly labor.

Furthermore, due to the omission of a screw-coupling area for screwing within the module, it is possible to prevent the generation of foreign matters generated during the screw-coupling process, which has the advantage of improving the quality of the image.

BRIEF DESCRIPTION OF DRAWINGS

FIG. 1 is a front perspective view of a camera module according to an exemplary embodiment of the present invention.

FIG. 2 is a perspective view showing a rear view of a camera module according to an exemplary embodiment of the present invention.

FIGS. 3 and 4 are cross-sectional views showing configurations within a camera module according to exemplary embodiments of the present invention from different angles.

FIG. 5 is an exploded perspective view of a camera module according to an exemplary embodiment of the present invention.

FIG. 6 is a drawing showing FIG. 5 from different angles.

FIG. 7 is a rear perspective view of the first body according to an exemplary embodiment of the present invention.

FIG. 8 is a front perspective view of a second body according to an exemplary embodiment of the present invention.

FIG. 9 is a cross-sectional view illustrating the coupling structure of the first body, second body and substrate according to an exemplary embodiment of the present invention.

BEST MODE

Hereinafter, exemplary embodiments of the present invention will be described in detail with reference to the accompanying drawings.

However, it should be noted that the technical ideas of the present invention should not be construed as limited to some of the explained exemplary embodiments but may be embodied in mutually different various shapes, and one or more elements may be selectively coupled or substituted among exemplary embodiments as long as within the scope of technical concept of the present invention.

Furthermore, terms (including technical and scientific terms) used in the embodiments of the present invention, unless expressly specifically defined and described, are to be interpreted in the sense in which they would be understood by a person of ordinary skill in the art to which the present invention belongs, and commonly used terms, such as dictionary-defined terms, are to be interpreted in light of their contextual meaning in the relevant art.

Furthermore, the terms used in the embodiments of the invention are intended to describe the embodiments and are not intended to limit the invention.

In this specification, the singular may include the plural unless the context otherwise requires, and references to "at least one (or more) of A and (or) B and C" may include one or more of any combination of A, B, and C that may be assembled.

In addition, the terms first, second, A, B, (a), (b), and the like may be used to describe components of embodiments of the invention. Such terms are intended only to distinguish one component from another, and are not intended to limit the nature or sequence or order of such components by such terms.

Furthermore, when a component is described as "connected," "coupled," or "attached" to another component, it can include cases where the component is "connected," "coupled," or "attached" to the other component directly, as well as cases where the component is "connected," "coupled," or "attached" to another component that is between the component and the other component.

Furthermore, when described as being formed or disposed "above" or "below" each component, "above" or "below" includes not only when two components are in direct contact with each other, but also when one or more other components are formed or disposed between the two components. Furthermore, when expressed as "above" or "below", it may include the meaning of upward as well as downward with respect to a single component.

As used herein, "optical axis direction" is defined as the optical axis direction of the lens. On the other hand, "optical axis direction" may correspond to "up-down direction", "z-axis direction", etc.

Hereinafter, a camera module according to an exemplary embodiment of the present invention will be described with reference to the accompanying drawings.

FIG. 1 is a front perspective view of a camera module according to an exemplary embodiment of the present invention, FIG. 2 is a perspective view showing a rear view of a camera module according to an exemplary embodiment of the present invention, FIGS. 3 and 4 are cross-sectional views showing configurations within a camera module according to exemplary embodiments of the present invention from different angles, FIG. 5 is an exploded perspective view of a camera module according to an exemplary embodiment of the present invention, FIG. 6 is a drawing showing FIG. 5 from different angles, FIG. 7 is a rear perspective view of the first body according to an exemplary embodiment of the present invention, FIG. 8 is a front perspective view of a second body according to an exemplary embodiment of the present invention, and FIG. 9 is a cross-sectional view illustrating the coupling structure of the first body, second body and substrate according to an exemplary embodiment of the present invention.

Referring to FIGS. 1 to 9, a camera module (10) according to an exemplary embodiment of the present invention may be an in-vehicle camera module. The camera module (10) may be coupled to a vehicle. The camera module (10) may be used in one or more of a front camera, a side camera, a rear camera, and a black box of the vehicle. The camera module (10) may be disposed at the front of the vehicle. The camera module (10) may be disposed at the rear of the vehicle. The camera module (10) may be coupled to a windscreen of the vehicle. The camera module (10) may be coupled to the windscreen of the front or rear of the vehicle. The camera module (10) may be disposed on the side of a vehicle. The camera module (10) may photograph a subject and output an image to a display (not shown).

The camera module (10) may include a first body (100), a second body (200), a substrate (300), a lens module (400), a light source module (500), and a sealing member (600), but may be implemented without some of these configurations, nor does it exclude additional configurations.

The camera module (10) may include a first body (100). The first body (100) may be referred to as a front body, in that it is disposed at the front of the camera module (10). The first body (100) may form the outline of the camera module (10) in combination with the second body (200). On the front of the first body (100), the lens module (400), the light source module (500), and the sealing member (600) may be combined. At the rear of the first body (100), the substrate (300) and the second body (200) may be combined.

The first body (100) may be compartmentalized into a first region (110) (see FIG. 6) to which the second body (200), the substrate (300), the lens module (400) and the sealing member (600) are coupled, and a second region (120) to which the light source module (500) is coupled. The first region (110) and the second region (120) may be disposed neighboring each other. At the front of the first region (110), the lens module (400) and the sealing member (600) may be coupled, and at the back of the first region (110), the substrate (300) and the second body (200) may be coupled. At the front of the second region (120), the light source module (500) may be coupled.

The first region (110) may include a front plate (111) forming a front surface, see FIG. 6, and a first side plate (140) extending rearwardly from an edge of the front plate (111) to form a side surface.

The first body (100) may include a lens coupling portion (112). The lens coupling portion (112) may include a space where the lens module (400) is coupled on an inner side.

The lens coupling portion (112) may include a region protruding forwardly from a front side of the front plate (111) than other regions, and a region protruding backwardly from a rear side of the front plate (111) than other regions. A sealing member coupling groove (114) may be formed on the front side of the lens coupling portion (112) in a shape that is recessed rearwardly than the other region, and the sealing member coupling groove (114) may be engaged with the sealing member (600).

On the front side of the second region (120), the light source module (500) may be coupled. At the front of the second region (120), a light source module guide (122) may be disposed, which projects forward of the other regions and supports the sides of the light source module (500). The light source module guide (122) may be disposed in each corner region of the second region (120) to support each corner region of the light source module (500). The light source module guide (122) may have a bulkhead shape and may compartmentalize the front of the second region (120) from other regions.

The second region (120) may include a first threaded hole (126) passing from the front to the rear, and a guide (127) projecting forward from the front of the second region (120). The first threaded hole (126) and the guide (127) may be disposed adjacent to each other. The guide (127) may be used to align the position of the light source module (500), which will be described later, when coupled to the first body (100).

The front of the second region (120) may be formed with a groove (124) that is recessed rearwardly from the other regions. The groove (124) may be coupled with a heat sink (or heat dissipation pad 590) to be described later. The groove (124) may be formed to correspond to a cross-sectional shape of the heat sink (590).

The second region (120) may include a hole (129) extending from front to rear. The hole (129) may be arranged to receive a connection terminal (550, see FIG. 5) in the light source module (500), which will be described later.

The light source module (500) may include a light source module substrate (510), a light source (520) disposed on a front surface of the light source module substrate (510), and connection terminal (550) disposed on a rear surface of the light source module substrate (510).

The light source module substrate (510) may be a printed circuit board (PCB). The light source module substrate (510) may include a second threaded hole through which a screw (530) penetrates, and a guide hole (512), wherein the second threaded hole and the guide hole (512) are each formed to penetrate from a front to a rear side of the light source module substrate (510). The second screw hole may be arranged to face the first screw hole (126). Accordingly, the screw (530) may penetrate the second threaded hole and be screwed into the first threaded hole (126). The guide hole (512) may be disposed facing the guide (127). Thus, when the light source module (500) is coupled to the second region (120), the guide (127) may be coupled to the guide hole (512). The sides of the light source module substrate (510) may be supported by the inner surface of the light source module guide (122).

The light source (520) may be disposed on the front of the light source module substrate (510), and may be capable of irradiating light. The light source (520) may be provided in plurality, and may be arranged adjacent to each other.

The connection terminal (550) may be disposed at the rear of the light source module substrate (510), and may protrude through the hole (129) to the rear of the first body (100). The connection terminal (550) may be electrically connected to an external terminal (not shown), whereby electrical signals for control of the light source (520) may be transmitted, received, and/or power may be provided to the light source module (500).

A heat sink (590) may be disposed in an area that overlaps optically axially with the light source (520). The heat sink (590) may be coupled to the groove (124). The heat sink (590) may be formed of a material having good thermal conductivity and may dissipate heat generated by the operation of the light source (520). A front side of the heat sink (590) may be in contact with a rear side of the light source module substrate (510).

At the rear of the second region (120), a rearwardly protruding heat sink fin (125) may be disposed. The disposition area of the heat sink fin (125) may be arranged such that at least a portion of the heat sink fin (125) overlaps optically axially with the light source (520). Since the cross-sectional area of the second region (120) is increased through the heat sink fin (125), the heat generated by the operation of the light source (520) can be efficiently dissipated.

The first body (100) may be coupled to the lens module (400). The lens module (400) may be coupled to the first region (110). The lens module (400) may be coupled to an inner side of the lens coupling portion (112). The lens module (400) may be disposed in a space within the lens coupling portion (112). The lens module (400) may include a plurality of lenses. The lens module (400) may be aligned with an image sensor (330) to be described later. The lens module (400) may be optically aligned with the image sensor (330). The optical axis of the lens module (400) may coincide with the optical axis of the image sensor (330). The first body (100) may include an infrared ray filter (IR filter) disposed between the lens module (400) and the image sensor (330).

As shown in FIG. 5, the lens module (400) may include a flange portion (410) and a barrel portion (420). The barrel portion (420) may be disposed at the rear of the flange portion (410). The cross-sectional area of the barrel portion (420) may be formed smaller than the cross-sectional area of the flange portion (410). The barrel portion (420) may be disposed in a space within the lens coupling portion (112), and the flange portion (410) may be disposed in front of the lens coupling portion (112). A sealing member (600) may be disposed between the rear of the flange portion (410) and the front of the lens coupling portion (112). The sealing member (600) may be coupled to a sealing member coupling groove (114) formed on the front side of the lens coupling portion (112), and may prevent external foreign matter from entering the interior of the camera module (10) through the rear side of the flange portion (410) and the front side of the lens coupling portion (112).

The substrate (300) may be disposed at the rear of the first body (100). The substrate (300) may be disposed at the rear of the first region (110). The substrate (300) may be disposed on an inner side of the first side plate (140). As shown in FIG. 7, the first body (100) may include a substrate support portion (150) that protrudes inwardly from the inner surface of the first side plate (140) to support the substrate (300). A front surface of the substrate (300) may contact a rear surface of the substrate support portion (150).

The substrate (300) may be a printed circuit board. An image sensor (330) may be disposed on the front of the substrate (300). The image sensor (330) may be disposed optically axially opposite the lens module (400). The substrate (300) may include a first hole (320) extending from the front to the rear. The first hole (320) may be plural, each disposed in a corner region of the substrate (300).

A connector (390) may be coupled to the rear of the substrate (300). The connector (390) may be shaped to protrude rearwardly from the rear of the substrate (300), and may be disposed in a space within the connector withdrawal portion (290) of the second body (200), to be described later.

The second body (200) may be coupled to the rear of the first body (100). The second body (200) may be coupled to a rear surface of the first region (110). The second body (200) may be disposed to cover the first region (110) and the rear surface of the substrate (300). The second body 200 may include a rear plate (210) forming the rear of the camera module (10), and a second side plate (220) extending forwardly from an edge of the rear plate (210) to form a side of the camera module (10). A rear side of the rear plate (210) may include a connector withdrawal portion (290) extending rearwardly and having the connector (390) disposed therein. A front side of the rear plate (210) may include a reinforcing rib (212) that projects forwardly over other areas. The reinforcing rib (212) may add to the strength of the rear plate (210).

In the following, the coupling structure of the first body (100) and the second body (200) will be described.

A first projection (130) may be disposed on the side of the first body (100). The first projection (130) may have a shape that protrudes outwardly from the outer surface of the first side plate (140) more than other areas. On the upper surface of the first projection (130), a slope (132) may be formed in a shape that decreases in projection height towards the rear. Accordingly, the first coupling portion (230), which will be described later, may be easily slid forward along the slope (132) when coupled with the second body (200). The first projection (130) may be provided in plurality and spaced apart from each other along the first side plate (140). A guide (139) may be disposed between adjacent first projections (130), and the guide (139) may be shaped to project outwardly from an outer surface of the first side plate (140).

At the rear of the front plate (111), a second coupling portion (160) may be formed that projects rearwardly. The second coupling portion (160) may be disposed on an inner side of the substrate support portion (150). The second coupling portion (160) may be plurally provided and disposed at corner regions of the first region (110), respectively.

The second coupling portions (160) may be disposed in a region optically facing the first hole (320) in the substrate (300).

More specifically, the second coupling portion (160) may include a first protruding region (162) projecting rearwardly from the rear of the front plate (111), and a second protruding region (161) projecting rearwardly from the rear of the first protruding region (162). A cross-sectional area of the second protruding region (161) may be formed smaller than a cross-sectional area of the first protruding region (162). On an outer surface of the first protruding region (162), a radially protruding first reinforcing rib (164) may be formed. The first reinforcing rib (164) may be provided in plurality, and may be spaced apart from each other along the circumferential direction of the first protruding region (162). The second protruding region (161) may be coupled to a second hole (241) in the second body (200), to be described later. A rear side of the first protruding region (162) may support a front side of the substrate (300). The rear of the first protruding region (162) may contact the front of the substrate (300).

A front side of the second body (200) may be disposed with a first coupling portion (230) that projects forwardly. The first coupling portion (230) may project forwardly from a front surface of the second side plate (220). With respect to a direction perpendicular to the optical axis direction, the first coupling portion (230) may include a first coupling hole (234) that penetrates the outer surface from the inner surface. Upon the second body (200) being coupled with the first body (100), the first coupling hole (234) may include the first projection (130). Through the first coupling portion (230) and the first projection (130), the first body (100) and the second body (200) may be hookedly joined.

On an outer surface of the first coupling portion (230), a protrusion (232) may be formed that projects outwardly from the other regions. The strength of the first coupling portion (230) may be enhanced by the protrusion (232).

The first coupling portion (230) may include a plurality of first coupling portions and may be spaced apart from each other. The area between adjacent first coupling portions (230) may have a grooved shape, and the guide (139) may be coupled between the adjacent first coupling portions (230).

The second body (200) may include a third coupling portion (240). The third coupling portion (240) may be disposed to protrude forwardly from a front surface of the rear plate (210). The third coupling portion (240) may be disposed to face optically axially with the first hole (320) of the substrate (300) and the second coupling portion (160) of the first body (100). The third coupling portion (240) may include a second hole (241) to which the second protruding region (161) is coupled on its inner side.

More specifically, the third coupling portion (240) may include a third protruding region (242) projecting forwardly from a front surface of the rear plate (210), and a fourth protruding region (244) projecting forwardly from a front surface of the third protruding region (242). The second hole (241) may be formed within the third protruding region (242) and the fourth protruding region (244). The cross-sectional area of the third protruding region (242) may be formed larger than the cross-sectional area of the fourth protruding region (244).

On the outer surface of the third protruding region (242), a second reinforcing rib (243) may be formed that protrudes radially. The second reinforcing rib (243) may be provided in plurality and may be spaced apart from each other along the circumferential direction of the third protruding region (242).

The outer surface of the fourth protruding region (244) may have a reinforcement (246) that projects outwardly from the other regions. The outer surface of the reinforcement (246) may be formed with a slope such that the protrusion height from the outer surface of the fourth protruding region (244) increases towards the rear. Accordingly, the fourth protruding region (244) may be easily coupled into the space within the first hole (320) of the substrate (300). The fourth protruding region (244) may be coupled into the first hole (320) of the substrate (300) in a press-fit manner. In this case, the rear of the substrate (300) may be supported by the front of the third protruding region (242). The rear of the substrate (300) may contact the front of the third protruding region (242).

Referring to FIGS. 4 and 9, when the first body (100), the second body (200) and the substrate (300) are coupled, the fourth protruding region (242) may be coupled in a first hole (320) in the substrate (300), and the second protruding region (161) may be coupled in a second hole (241) of the second body (200).

Describing the assembly process of the camera module (10) according to an exemplary embodiment of the present invention, the substrate (300) is first assembled on the rear side of the first body (100). At this time, the second protruding region (161) may be coupled to a first hole (320) in the substrate (300). Accordingly, the substrate (300) may be firstly secured to the rear surface of the first body (100).

Next, the second body (200) is coupled to the first body (100). The coupling of the second body (200) to the first body (100) may be accomplished by hook coupling through the first coupling portion (230) and the first projection (130), and by interposing the fourth protruding region (244) between the first hole (320) and the second protruding region (161). In this process, the reinforcement (246) may be formed to be larger than the outer diameter of the first hole (320), thereby increasing the holding force as the reinforcement (246) is compressed during the process of coupling the substrate (300).

Thereafter, the assembly of the camera module (10) may be completed by coupling the lens module (400) to the front of the first body (100) to align with the image sensor (330), and by coupling the light source module (500), including the heat sink (590), to the front of the second region (120).

According to the structure as described above, separate parts such as screws for joining the plurality of bodies together become unnecessary, which has the advantage of lowering the manufacturing unit cost and improving production efficiency by reducing the number of parts and assembly labor.

Furthermore, due to the omission of a screwing area for screwing within the module, it is possible to prevent the generation of foreign matter generated during the screw-coupling process, which has the advantage of improving the quality of the image.

Although embodiments of the invention have been described above with reference to the accompanying drawings, it will be appreciated by those having ordinary skill in the technical field to which the invention belongs that the invention may be embodied in other specific forms without altering its technical ideas or essential features. It should therefore be understood that the embodiments described above are exemplary in all respects and are not intended to be limiting.

The invention claimed is:

1. A camera module comprising:
a first body;
a second body coupled to a rear surface of the first body;
a substrate disposed between the first body and the second body; and
a lens module coupled to a front surface of the first body;
wherein;
    the first body includes a front plate and a first side plate extending rearward from the first plate,
    the second body includes a rear plate, a second side plate extending forward from the rear plate, and a first coupling portion provided at the second side plate
    the first side plate and the first coupling portion are hook-coupled,
    the substrate includes a first hole passing from front to rear, the first body includes a second coupling portion projecting rearwardly from a rear surface of the front plate and disposed at least partially within the first hole, the second body includes a third coupling portion projecting forwardly from a front surface of the rear plate and disposed at least partially within the first hole,
    the third coupling portion includes a third protruding region projecting forward from a front surface of the rear plate, and a fourth protruding region projecting forward from a front surface of the third protruding region,
    a second hole, into which the second coupling portion is coupled, is disposed at the fourth protruding region,
    the fourth protruding region is coupled to the first hole of the substrate, and
    a rear surface of the substrate contacts a front surface of the third protruding region.

2. The camera module of claim 1, wherein an outer surface of the first side plate is provided with a first projection projecting outwardly, and the first coupling portion includes a first coupling hole to join the first projection.

3. The camera module of claim 2, wherein, on an upper surface of the first projection, a slope is disposed in a shape wherein the projection height from the first side plate decreases towards the rear.

4. The camera module of claim 2, wherein an outer surface of the first coupling portion is provided with a protrusion that protrudes outwardly from other areas of the first coupling portion.

5. The camera module of claim 2, wherein each of the first projection and the first coupling portion is provided in a plurality, and a region between adjacent first coupling portions has a groove shape, and between adjacent first projections is disposed a guide protruding outwardly from the outer surface of the first side plate and coupled to a region between adjacent first coupling portions.

6. The camera module of claim 1, comprising a sealing member disposed between the lens module and the first body,
    wherein a sealing member coupling groove into which the sealing member is coupled is formed on a front surface of the first body.

7. The camera module of claim 1, wherein the fourth protruding region is coupled into the first hole of the substrate in a press-fit manner.

8. The camera module of claim 1,
    wherein the second coupling portion includes a first protruding region projecting rearwardly from a rear surface of the front plate, and a second protruding region projecting rearwardly from a rear surface of the first protruding region, wherein a cross-sectional area of the first protruding region is formed larger than a cross-sectional area of the second protruding region, wherein a rear surface of the first protruding region supports a front surface of the substrate, and wherein the second protruding region is coupled to the second hole.

9. The camera module of claim 8, wherein a first reinforcing rib protrudes radially from an outer surface of the first protruding region.

10. The camera module of claim 1, wherein wherein a cross-sectional area of the third protruding region is formed larger than a cross-sectional area of the fourth protruding region.

11. The camera module of claim 10, wherein a second reinforcing rib protrudes radially from an outer surface of the third protruding region.

12. The camera module of claim 10, wherein a reinforcement part protruding outward is disposed on an outer surface of the fourth protruding region, wherein an inclined surface is formed on an outer surface of the reinforcement part in a shape in which a protrusion height from the fourth protrusion region increases as it goes toward a rear.

13. The camera module of claim 1, wherein the first body includes a first region in which the second body, the substrate and the lens module are coupled, and a second region adjacent to the first region, and a light source module including a light source is disposed on a front side of the second region.

14. The camera module of claim 13, wherein a heat dissipation pad is disposed on a front surface of the second region that overlaps the light source in an optical axis direction.

15. The camera module of claim 14, wherein a heat dissipation fin protruding backward is disposed at a rear of the second region.

16. A camera module comprising:

a first body;

a second body coupled to a rear surface of the first body;

a substrate disposed between the first body and the second body; and a lens module coupled to a front surface of the first body, wherein:

the first body includes a first region in which the second body, the substrate and the lens module are coupled, and a second region adjacent to the first region, and a light source module including a light source is disposed on a front side of the second region, the first body includes a front plate and a first side plate extending rearward from the first plate, the second body includes a rear plate, a second side plate extending forward from the rear plate, and a first coupling portion provided at the second side plate, the first side plate and the first coupling portion are hook-coupled, the substrate includes a first hole passing from front to rear, the first body includes a second coupling portion projecting rearwardly from a rear surface of the front plate and disposed at least partially within the first hole, the second body includes a third coupling portion projecting forwardly from a front surface of the rear plate and disposed at least partially within the first hole, the third coupling portion includes a third protruding region projecting forward from a front surface of the rear plate, and a fourth protruding region projecting forward from a front surface of the third protruding region, a second hole, into which the second coupling portion is coupled, is disposed at the fourth protruding region, the fourth protruding region is coupled to the first hole of the substrate, and a rear surface of the substrate contacts a front surface of the third protruding region.

17. The camera module of claim 16, wherein a heat dissipation pad is disposed on a front surface of the second region that overlaps the light source in an optical axis direction.

18. The camera module of claim 17, wherein a heat dissipation fin protruding backward is disposed at a rear of the second region.

19. The camera module of claim 16, wherein the fourth protruding region is coupled into the first hole of the substrate in a press-fit manner.

20. The camera module of claim 16, wherein a second reinforcing rib protrudes radially from an outer surface of the third protruding region.

* * * * *